United States Patent
Shitara et al.

(10) Patent No.: US 11,326,118 B2
(45) Date of Patent: May 10, 2022

(54) LUBRICATION METHOD

(71) Applicant: ENEOS Corporation, Tokyo (JP)

(72) Inventors: Yuji Shitara, Tokyo (JP); Yohei Shono, Tokyo (JP); Hidetoshi Ogata, Tokyo (JP); Kazushi Kodama, Tokyo (JP); Hiroshi Matsuura, Tokyo (JP); Satoshi Masuyama, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/258,304

(22) PCT Filed: Jul. 30, 2019

(86) PCT No.: PCT/JP2019/029900
§ 371 (c)(1),
(2) Date: Jan. 6, 2021

(87) PCT Pub. No.: WO2020/031797
PCT Pub. Date: Feb. 13, 2020

(65) Prior Publication Data
US 2021/0269730 A1    Sep. 2, 2021

(30) Foreign Application Priority Data

Aug. 6, 2018   (JP) .............................. JP2018-147691

(51) Int. Cl.
*C10M 105/06*   (2006.01)
*C08J 7/06*   (2006.01)
(Continued)

(52) U.S. Cl.
CPC ............ *C10M 105/06* (2013.01); *C08J 7/065* (2013.01); *C10M 101/02* (2013.01);
(Continued)

(58) Field of Classification Search
CPC .............. C10M 105/06; C10M 101/02; C10M 2203/065; C10M 2203/1006; C08J 7/065;
(Continued)

(56) References Cited

U.S. PATENT DOCUMENTS

| 2,943,057 A | 6/1955 | Eiseman, Jr. | |
| 5,124,397 A * | 6/1992 | Kanazawa | ............... C08K 3/04 524/495 |

(Continued)

FOREIGN PATENT DOCUMENTS

| JP | 03-059068 | 3/1991 |
| JP | 04-001262 | 1/1992 |

(Continued)

OTHER PUBLICATIONS

ISR issued in WIPO Patent Application No. PCT/JP2019/029900, dated Oct. 15, 2019, English translation.
(Continued)

*Primary Examiner* — Ellen M McAvoy
(74) *Attorney, Agent, or Firm* — Greenblum & Bernstein, P.L.C.

(57) ABSTRACT

A lubrication method including lubricating a sliding member which contains at least one selected from the group consisting of a liquid crystal polymer and polyetheretherketone by using a lubricating oil composition which contains at least one selected from the group consisting of a mineral oil and alkyl benzene as a lubricating base oil.

4 Claims, 1 Drawing Sheet

(51) Int. Cl.
*C10M 101/02* (2006.01)
*C10N 20/02* (2006.01)

(52) U.S. Cl.
CPC ........ *C08J 2367/03* (2013.01); *C08J 2371/08* (2013.01); *C10M 2203/065* (2013.01); *C10M 2203/1006* (2013.01); *C10N 2020/02* (2013.01)

(58) Field of Classification Search
CPC .............. C08J 2367/03; C08J 2371/08; C10N 2020/02; C10N 2040/30
See application file for complete search history.

(56) References Cited

U.S. PATENT DOCUMENTS

| | | | |
|---|---|---|---|
| 5,131,827 A | 7/1992 | Tasaka | |
| 5,998,339 A * | 12/1999 | Kato | ..................... F16C 33/201 508/106 |
| 2005/0096234 A1 * | 5/2005 | Mack, Sr. | ................. C08K 7/00 508/108 |
| 2009/0136376 A1 | 5/2009 | Nakamura | |
| 2011/0262059 A1 * | 10/2011 | Karaki | ..................... F16C 43/02 384/13 |
| 2014/0187721 A1 * | 7/2014 | Ito | ......................... C08L 101/00 525/151 |
| 2015/0274961 A1 | 10/2015 | Ito et al. | |
| 2016/0091022 A1 * | 3/2016 | Kamiya | ............... C10M 125/00 384/297 |
| 2016/0097569 A1 * | 4/2016 | Matsunaga | ............. F25B 49/02 62/324.6 |
| 2017/0233671 A1 * | 8/2017 | Yamauchi | ............ C10M 125/10 508/106 |
| 2020/0377681 A1 * | 12/2020 | Hayashi | ............. C08G 73/1071 |

FOREIGN PATENT DOCUMENTS

| | | |
|---|---|---|
| JP | 04-004295 | 1/1992 |
| JP | 04-004296 | 1/1992 |
| JP | 06-313431 | 11/1994 |
| JP | 07-268126 | 10/1995 |
| JP | 09-020883 | 1/1997 |
| JP | 10-045650 | 2/1998 |
| JP | 2002-115686 | 4/2002 |
| JP | 2003-342557 | 12/2003 |
| JP | 2005-098611 | 4/2005 |
| JP | 2009-511829 | 3/2009 |
| JP | 2010-159310 | 7/2010 |
| JP | 2011-202062 | 10/2011 |
| JP | 2014-133897 | 7/2014 |
| JP | 2019-014787 | 1/2019 |
| WO | 2007/043604 | 4/2007 |
| WO | 2007/058072 | 5/2007 |
| WO | 2010/078015 | 7/2010 |
| WO | 2018/062357 | 5/2019 |

OTHER PUBLICATIONS

IPRP issued in WIPO Patent Application No. PCT/JP2019/029900, dispatched Feb. 18, 2021, English translation.
Partial Supplementary Search Report issued in EP Patent Application No. 19848630.0, dated Dec. 20, 2021.

* cited by examiner

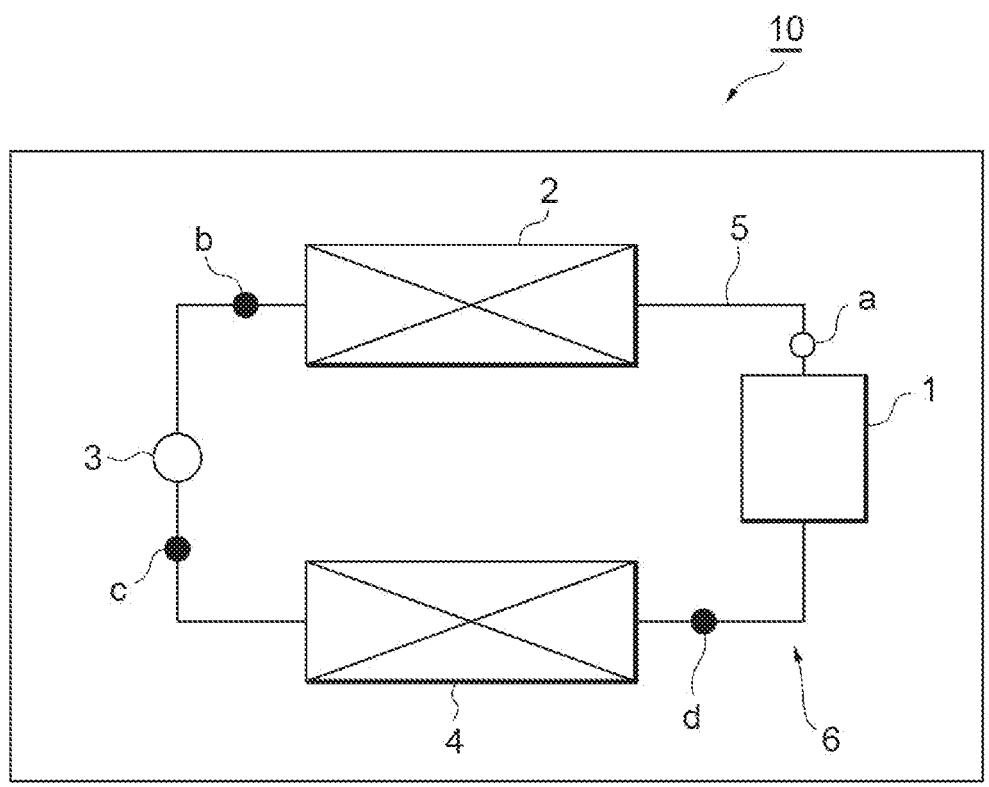

LUBRICATION METHOD

TECHNICAL FIELD

The present invention relates to a lubrication method.

BACKGROUND ART

In a mechanical device having a sliding unit such as a metal component, or the like, various lubricants are used for lubricating the sliding unit. As the lubricant, lubricating oils blended with various additives as necessary, grease, and the like are used.

Furthermore, in recent years, from the viewpoints of weight saving of components, easiness of processing, and the like in view of fuel saving and the like, as a member (sliding member) constituting the sliding unit, a synthetic resin has been widely used in many use applications.

For example, Patent Literature 1 describes that a lubricant (a refrigerating machine oil) containing a base oil, which contains at least one substance selected from the group consisting of a mineral oil, a synthetic alicyclic hydrocarbon compound, and a synthetic aromatic hydrocarbon compound as a main component and has a kinematic viscosity at 40° C. of 1 to 8 $mm^2/s$, is applied to a sliding part composed of polyphenylene sulfide or the like or a sliding part having a polymer coating film or an inorganic coating film.

CITATION LIST

Patent Literature

Patent Literature 1: International Publication WO 2007/058072

SUMMARY OF INVENTION

Technical Problem

In a case where a synthetic resin is used as a member constituting the sliding unit, it is indispensable to achieve improvement in sliding property as compared to the case of using a metal component or the like. However, the conventional lubrication method cannot be necessarily satisfied from the viewpoint of sliding property.

The present invention has been made in view of such circumstances, and an object thereof is to provide a lubrication method superior in sliding property.

Solution to Problem

The present invention provides a lubrication method comprising lubricating a sliding member by using a lubricating oil composition. In the lubrication method according to the present invention, the sliding member contains at least one selected from the group consisting of a liquid crystal polymer and polyetheretherketone and the lubricating oil composition contains at least one selected from the group consisting of a mineral oil and alkyl benzene as a lubricating base oil.

The lubricating oil composition may contain a mineral oil as a lubricating base oil.

In a case where the lubricating oil composition contains a mineral oil as the lubricating base oil, the sliding member may contain a liquid crystal polymer.

In a case where the lubricating oil composition contains a mineral oil as the lubricating base oil and the sliding member contains a liquid crystal polymer, the sliding member may further contain a reinforcement fiber.

In a case where the lubricating oil composition contains a mineral oil as the lubricating base oil and the sliding member contains a liquid crystal polymer, the sliding member may further contain a solid lubricant.

In the above description, in a case where the sliding member further contains a solid lubricant, the solid lubricant may contain a fluororesin and carbon black.

In the lubrication method according to the present invention, the sliding member may contain polyetheretherketone.

In a case where the sliding member contains polyetheretherketone, the sliding member may further contain a reinforcement fiber.

In a case where the sliding member contains polyetheretherketone, the sliding member may further contain a solid lubricant.

In the above description, in a case where the sliding member further contains a solid lubricant, the solid lubricant may contain molybdenum sulfide and graphite and may contain boron nitride and graphite.

In a case where the sliding member contains polyetheretherketone and further contains a reinforcement fiber and a solid lubricant and the solid lubricant contains boron nitride and graphite, the content of the reinforcement fiber may be equal to or more than the total content of boron nitride and graphite.

In the lubrication method according to the present invention, a kinematic viscosity at 40° C. of the lubricating base oil may be 1 to 100 $mm^2/s$.

In the lubrication method according to the present invention, a kinematic viscosity at 40° C. of the lubricating oil composition may be 1 to 100 $mm^2/s$.

Advantageous Effects of Invention

According to the present invention, it is possible to provide a lubrication method superior in sliding property.

BRIEF DESCRIPTION OF DRAWINGS

FIG. 1 is a schematic diagram illustrating an embodiment of a refrigerating machine.

DESCRIPTION OF EMBODIMENTS

Hereinafter, embodiments of the present invention will be described in detail with reference to the drawings; however, the present invention is not limited to the following embodiments at all.

FIG. 1 is a diagram schematically illustrating an embodiment of a refrigerating machine as an example of a mechanical device. As illustrated in FIG. 1, a refrigerating machine 10 includes at least a refrigerant circulation system 6 in which a compressor (refrigerant compressor) 1, a condenser (gas cooler) 2, an expansion mechanism 3 (a capillary, an expansion valve, or the like), and an evaporator (heat exchanger) 4 are sequentially connected via a flow passage 5.

In the refrigerant circulation system 6, first, a high temperature (usually 70° C. to 120° C.) refrigerant discharged from the compressor 1 into the flow passage 5 becomes a high-density fluid (supercritical fluid or the like) in the condenser 2. Subsequently, the refrigerant is passed through a narrow flow passage of the expansion mechanism 3 so as to be liquefied, and is further vaporized by the evaporator 4 to have a low temperature (usually −40° C. to 0° C.). The cooling by the refrigerating machine 10 utilizes the phenomenon of a refrigerant taking heat from the surrounding when the refrigerant is vaporized by the evaporator 4.

In the compressor 1, a small amount of the refrigerant and a large amount of the refrigerating machine oil coexist under a high temperature (usually 70° C. to 120° C.) condition. The refrigerant discharged from the compressor 1 to the flow passage 5 is gaseous and contains a small amount (usually 1 to 10 vol %) of the refrigerating machine oil in the form of a mist, but, in this refrigerating machine oil mist, a small amount of the refrigerant is dissolved (point a in FIG. 1).

In the condenser 2, the gaseous refrigerant is compressed to be a high-density fluid, and a large amount of the refrigerant and a small amount of the refrigerating machine oil coexist under a relatively high temperature (usually 50° C. to 70° C.) condition (point b in FIG. 1). Further, a mixture of a large amount of the refrigerant and a small amount of the refrigerating machine oil is sequentially supplied to the expansion mechanism 3 and the evaporator 4 to rapidly have a lower temperature (usually −40° C. to 0° C.) (points c and d in FIG. 1) and be returned back to the compressor 1 again.

Examples of such a refrigerating machine 10 include air conditioners for automobiles, dehumidifiers, refrigerators, freezing-refrigerating warehouses, automatic vending machines, showcases, cooling apparatuses for chemical plants or the like, air conditioners for housing, packaged air conditioners, and heat pumps for hot water supply.

The refrigerant is filled in the refrigerant circulation system 6. Examples of the refrigerant include fluorine-containing ether-based refrigerants such as a saturated fluorohydrocarbon (HFC) refrigerant, an unsaturated fluorohydrocarbon (HFO) refrigerant, a hydrocarbon refrigerant, and perfluoroethers, a bis(trifluoromethyl)sulfide refrigerant, a trifluoroiodomethane refrigerant, and natural refrigerants such as ammonia (R717) and carbon dioxide (R744).

The refrigerant circulation system 6 has a sliding member. The sliding member may be provided, for example, in the compressor 1.

A lubrication method according to the present embodiment is used in the mechanical device as mentioned above, and for example, in the refrigerating machine 10 illustrated in FIG. 1, the lubrication method comprises lubricating a sliding unit in the compressor 1 of the refrigerating machine 10 by using a lubricating oil composition.

The sliding unit is a unit which is provided with a pair of members (sliding members) facing each other and relatively moving and slides through a sliding surface in the member.

At least one of the sliding members contains at least one selected from the group consisting of a liquid crystal polymer and polyetheretherketone. That is, the sliding member may contain a liquid crystal polymer, may contain polyetheretherketone, and may contain a liquid crystal polymer and polyetheretherketone. Furthermore, the sliding member may be obtained by molding and curing a resin composition containing at least one selected from the group consisting of a liquid crystal polymer and polyetheretherketone, and at least a part of an arbitrary member may have a sliding surface coated with a cured product of a resin composition containing at least one selected from the group consisting of a liquid crystal polymer and polyetheretherketone. The arbitrary member is not particularly limited, and examples thereof include metal-based materials such as iron-based materials, aluminum-based materials, and magnesium-based materials, polymers other than a liquid crystal polymer and polyetheretherketone, and non-metal-based materials such as plastic and carbon. The polymers other than the liquid crystal polymer and polyetheretherketone are not particularly limited, and examples thereof include polyethylene, polystyrene, polypropylene, polyvinyl chloride, polyamide, polyacetal, polycarbonate, polysulfone, polyphenylene sulfide, polyamide imide, a phenolic resin, and an epoxy resin.

The liquid crystal polymer (hereinafter, also abbreviated as "LCP" in some cases) is generally called a thermotropic liquid crystal polymer and is a polymer exhibiting optically anisotropic property in a molten state and having thermoplasticity. Examples of the LCP include a liquid crystal polyester having at least a constitutional unit represented by the following Formula (I).

[Chemical Formula 1]

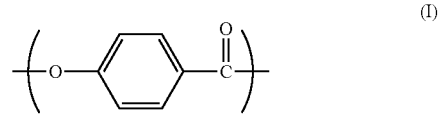

(I)

Examples of a monomer giving Formula (I) include p-hydroxybenzoic acid (HBA), acetylated products, ester derivatives, and acid halides thereof.

The content ratio of the structural unit of Formula (I) in the LCP is preferably 50 mol % or more, more preferably 55 mol % or more, further preferably 60 mol % or more, preferably 100 mol % or less, more preferably 80 mol % or less, and further preferably 70 mol % or less, from the viewpoint of improving the sliding property of a molded article.

The LCP may further have a structural unit represented by the following Formula (II) in addition to the structural unit represented by Formula (I).

[Chemical Formula 2]

(II)

In Formula (II), $Ar^1$ may be, for example, a phenylene group, a biphenylene group, a naphthylene group, an anthrylene group, or a phenanthrylene group which optionally has a substituent. Among these, one selected from the group consisting of a phenylene group and a biphenylene group is preferred. Examples of the substituent include an alkyl group, an alkoxy group, and fluorine. Each of the alkyl group and the alkoxy group may be linear or branched. The number of carbon atoms of each of the alkyl group and the alkoxy group is preferably 1 to 10 and more preferably 1 to 5.

Examples of a monomer giving Formula (II) include 4,4-dihydroxybiphenyl (BP), hydroquinone (HQ), methylhydroquinone (MeHQ), and acylated products thereof.

The content ratio of the structural unit of Formula (II) in the LCP is preferably 5 mol % or more, more preferably 10 mol % or more, preferably 25 mol % or less, and more preferably 20 mol % or less, from the viewpoint of improving the sliding property of a molded article.

The LCP may further have a structural unit represented by the following Formula (III) in addition to the structural unit represented by Formula (I).

[Chemical Formula 3]

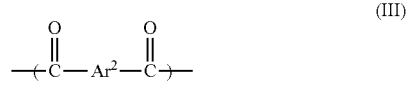

(III)

In Formula (III), Ar² may be, for example, a phenylene group, a biphenylene group, a naphthylene group, an anthrylene group, or a phenanthrylene group which optionally has a substituent. Among these, one selected from the group consisting of a phenylene group and a naphthylene group is preferred. Examples of the substituent include an alkyl group, an alkoxy group, and fluorine. Each of the alkyl group and the alkoxy group may be linear or branched. The number of carbon atoms of each of the alkyl group and the alkoxy group is preferably 1 to 10 and more preferably 1 to 5.

Examples of a monomer giving Formula (III) include terephthalic acid (TPA), isophthalic acid (IPA), 2,6-naphthalene dicarboxylic acid (NADA), and ester derivatives and acid halides thereof.

The content ratio of the structural unit of Formula (III) in the LCP is preferably 5 mol % or more, more preferably 10 mol % or more, preferably 25 mol % or less, and more preferably 20 mol % or less, from the viewpoint of improving the sliding property of a molded article.

The LCP may further have a structural unit represented by the following Formula (IV) in addition to the structural unit represented by Formula (I).

[Chemical Formula 4]

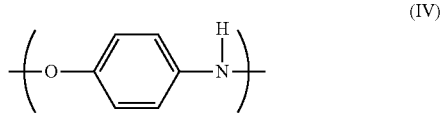

(IV)

Examples of a monomer giving Formula (IV) include acetaminophenone (AAP), p-aminophenol, and 4'-acetoxyacetanilide.

The content ratio of the structural unit of Formula (IV) in the LCP is preferably 1 mol % or more, more preferably 3 mol % or more, preferably 10 mol % or less, and more preferably 7 mol % or less, from the viewpoint of improving the sliding property of a molded article.

The LCP may further have a structural unit represented by the following Formula (V) in addition to the structural unit represented by Formula (I).

[Chemical Formula 5]

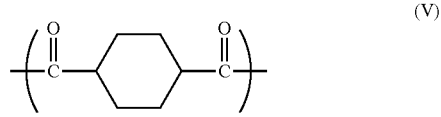

(V)

Examples of a monomer giving Formula (V) include 1,4-cyclohexane dicarboxylic acid (CHDA), and ester derivatives and acid halides thereof.

The content ratio of the structural unit of Formula (V) in the LCP is preferably 1 mol % or more, more preferably 3 mol % or more, and preferably 10 mol % or less, from the viewpoint of improving the sliding property of a molded article.

In a case where the LCP is composed of the structural units represented by Formula (I), Formula (II), and Formula (III), the content ratio of the structural unit of Formula (II) in the LCP is preferably an amount substantially equivalent to the content ratio of the structural unit of Formula (III). In a case where the LCP further contains the structural units represented by Formula (IV) and Formula (V) in addition to the structural units represented by Formula (I), Formula (II), and Formula (III), the total content ratio of the structural units represented by Formula (II) and Formula (IV) in the LCP is preferably an amount substantially equal to the total content ratio of the structural units represented by Formula (III) and Formula (V).

The melting point of the LCP is preferably 290° C. or higher, more preferably 295° C. or higher, further preferably 300° C. or higher, and particularly preferably 310° C. or higher, from the viewpoint of improving heat resistance with respect to thermal processing of a molded article. The upper limit of the melting point of the LCP is not particularly limited, and may be, for example, 360° C. or lower or 355° C. or lower. Incidentally, in the present specification, the melting point of the LCP is a value measured according to ISO 11357 and ASTM D3418, and can be measured, for example, by using a differential scanning calorimeter (DSC) manufactured by Hitachi High-Tech Corporation, or the like.

The LCP can be produced, for example, by providing at least the monomer giving a structural unit of Formula (I), and optionally, the monomers giving structural units of Formula (II) to Formula (V) to a known polymerization method such as melt polymerization, solid phase polymerization, solution polymerization, or slurry polymerization. For example, the LCP can also be produced by only solution polymerization and can also be produced by two-stage polymerization of preparing a prepolymer by melt polymerization and further subjecting this prepolymer to solid phase polymerization.

In a case where the polymerization reaction is performed in two-stages of melt polymerization followed by solid phase polymerization, the prepolymer obtained by melt polymerization is cooled and solidified, subsequently triturated into a powder form or a flake form, and then a known solid phase polymerization method, for example, a method of thermally treating etc. a prepolymer resin for 1 to 30 hours at a temperature range of 200° C. to 350° C. under an inert atmosphere such as nitrogen or under a vacuum environment is preferably selected. The solid phase polymerization may be performed while stirring or in a static state without stirring.

The polymerization reaction may be performed with or without the use of a catalyst. As the catalyst used, those conventionally known as a catalyst for polymerization of polyester can be used, and examples thereof include metal salt catalysts such as magnesium acetate, tin (I) acetate, tetrabutyl titanate, lead acetate, sodium acetate, potassium acetate, and antimony trioxide, and organic compound catalysts such as nitrogen-containing heterocyclic compounds such as N-methyl imidazole. The amount of catalyst used is not particularly limited, and may be 0.0001 to 0.1 parts by mass with respect to the total amount of 100 parts by mass of the monomers.

The polymerization reaction device in melt polymerization is not particularly limited, and reaction devices which are used for reaction of a general high-viscosity fluid are preferably used. Examples of these reaction devices include types of anchor, multi-stage, spiral band, spiral shaft, and the like, or stirred tank-type polymerization reaction devices equipped with a stirrer having stirring blades in various shapes formed by modifying such types, and mixing devices which are generally used for mixing and kneading resins such as a kneader, a roll mill, and a Banbury mixer.

The polyetheretherketone (hereinafter, also abbreviated as "PEEK" in some cases) is one type of semicrystalline polymers having a structure in which benzene rings are connected by an ether bond and a ketone group, and is, for example, a polymer having the following structure.

[Chemical Formula 6]

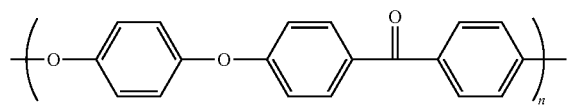

(VI)

The molecular weight of PEEK is not particularly limited, and for example, the number average molecular weight Mn may be 20000 to 50000 and the weight average molecular weight Mw may be 60000 to 150000. Mw/Mn representing molecular weight distribution may be 2 to 4. Incidentally, the molecular weight is measured by a GPC method, and each molecular weight is a relative value based on polystyrene.

The member may contain other components such as a solid lubricant, a reinforcement fiber, other fillers, and additives in addition to the above-described components, from the viewpoint of further improving sliding property.

Examples of the solid lubricant include boron nitride, molybdenum sulfide (such as molybdenum disulfide), a fluororesin, and a carbon-based solid lubricant (such as graphite or carbon black). Among these, from the viewpoint of having further superior sliding property, at least one selected from the group consisting of boron nitride and molybdenum sulfide is preferred. In particular, in a case where the sliding member contains the above-described liquid crystal polymer, a fluororesin and carbon black are preferably used as the solid lubricant. In a case where the sliding member contains the above-described polyetheretherketone, molybdenum sulfide and graphite or boron nitride and graphite are preferably used as the solid lubricant.

In a case where the sliding member contains a solid lubricant, the content thereof may be 0.1 to 30 mass % and 0.5 to 20 mass % based on the total amount of the sliding member. When the content of the solid lubricant is 30 mass % or less based on the total amount of the sliding member, a defect is less likely to occur in a step of processing a compound into a pellet, and mechanical properties such as impact strength as the sliding member can be prevented from being significantly degraded. On the other hand, when the content of the solid lubricant is 0.1 mass % or more based on the total amount of the sliding member, the effect of the solid lubricant can be sufficiently obtained.

Examples of the reinforcement fiber include glass fiber, carbon fiber, aramid fiber, and fibrous materials such as various whiskers. Among these, from the viewpoint of having further superior sliding property, glass fiber, carbon fiber, aramid fiber, and the like are preferred, and from the viewpoint of suppressing the abrasion of the sliding member at the time of sliding, carbon fiber, aramid fiber, and the like are preferred.

In a case where the sliding member contains a reinforcement fiber, the content thereof may be 0.1 to 80 mass % or less and 0.5 to 70 mass % or less based on the total amount of the sliding member. When the content of the reinforcement fiber is 80 mass % or less based on the total amount of the member, a defect is less likely to occur in a step of processing a compound into a pellet, and mechanical properties such as impact strength as the sliding member can be prevented from being significantly degraded. On the other hand, when the content of the reinforcement fiber is 0.1 mass % or more based on the total amount of the sliding member, the effect of the reinforcement fiber can be sufficiently obtained.

In particular, in a case where the sliding member contains polyetheretherketone and further contains a reinforcement fiber and a solid lubricant and the solid lubricant contains boron nitride and graphite, the content of the reinforcement fiber is preferably equal to or more than the total content of boron nitride and graphite.

Examples of other fillers include talc, mica, a glass flake, clay, sericite, calcium carbonate, calcium sulfate, calcium silicate, silica, alumina, aluminum hydroxide, calcium hydroxide, potassium titanate, titanium oxide, fluorocarbon resin fiber, a fluorocarbon resin, barium sulfate, and various whiskers.

Examples of the other additives include a colorant, a dispersant, a plasticizer, an antioxidant, a curing agent, a flame retardant, a thermal stabilizer, an ultraviolet absorber, an antistatic agent, and a surfactant.

The content of the other filler and additives is not particularly limited, but may be 10 mass % or less and 5 mass % or less based on the total amount of the sliding member.

The member is preferably composed of at least one selected from the group consisting of the aforementioned liquid crystal polymer and polyetheretherketone, and may contain other polymers in a range that the effect of the present invention is not significantly impaired.

The polymers other than the liquid crystal polymer and polyetheretherketone are not particularly limited, and examples thereof include polyethylene, polystyrene, polypropylene, polyvinyl chloride, polyamide, polyacetal, polycarbonate, polysulfone, polyphenylene sulfide, polyamide imide, a phenolic resin, and an epoxy resin.

As for the pair of sliding members facing each other and relatively moving, both the members may be a member containing at least one selected from the group consisting of the aforementioned liquid crystal polymer and polyetheretherketone, and one of the members may be a member containing at least one selected from the group consisting of the aforementioned liquid crystal polymer and polyetheretherketone. In a case where one of the members is a member containing at least one selected from the group consisting of the aforementioned liquid crystal polymer and polyetheretherketone, the other of the members is not particularly limited, and examples thereof include metal-based materials such as iron-based materials, aluminum-based materials, and magnesium-based materials, polymers other than a liquid crystal polymer and polyetheretherketone, and non-metal-based materials such as plastic and carbon. As the polymers other than the liquid crystal polymer and polyetheretherketone, the aforementioned polymers are exemplified.

The lubrication method according to the present embodiment lubricates the aforementioned sliding member by using a lubricating oil composition. The lubricating oil composition contains at least one selected from the group consisting of a mineral oil and alkyl benzene as the lubricating base oil.

In particular, in a case where the sliding member contains a liquid crystal polymer, the lubricating oil composition preferably contains a mineral oil as the lubricating base oil.

Examples of the mineral oil include paraffinic mineral oils and naphthenic mineral oils refined by subjecting lubricating oil fractions obtained by atmospheric pressure distillation and reduced pressure distillation of crude oils to one of refining treatments such as solvent deasphalting, solvent extraction, hydrocracking, solvent dewaxing, catalytic dewaxing, hydrorefining, sulfuric acid cleaning, and clay treatment or two or more refining treatments suitably combined, and particularly, normal paraffin and isoparaffin. Incidentally, these mineral oils may be used alone or two or more kinds thereof may be combined at an arbitrary ratio and then used.

The kinematic viscosity at 40° C. of the lubricating base oil may be, for example, 1 mm$^2$/s or more, 2 mm$^2$/s or more, or 2.5 mm$^2$/s or more, and may be 100 mm$^2$/s or less, 80 mm$^2$/s or less, 60 mm$^2$/s or less, 50 mm$^2$/s or less, 40 mm$^2$/s or less, 30 mm$^2$/s or less, 20 mm$^2$/s or less, or 10 mm$^2$/s or less, from the viewpoint of sliding property. In the present specification, the kinematic viscosity at 40° C. means a kinematic viscosity at 40° C. measured according to JIS K 2283:2000. Furthermore, the viscosity of the lubricating base oil based on the ISO viscosity grade may be, for example, VG2 or more or VG3 or more, and may be VG100 or less, VG10 or less, or VG8 or less.

The flash point of the lubricating base oil may be, for example, 100° C. or higher, 110° C. or higher, or 120° C. or higher, from the viewpoint of safety. The flash point in the present specification means a flash point measured according to JIS K 2265-4:2007 (cleveland open cup (COC) method).

The acid value of the lubricating base oil may be, for example, 1 mgKOH/g or less, 0.5 mgKOH/g or less, or 0.1 mgKOH/g or less, from the viewpoint of stability. The acid value in the present specification means an acid value measured according to JIS K 2501:2003.

The pour point of the lubricating base oil may be, for example, −10° C. or lower, or −20° C. or lower, and may be −50° C. or lower, and from the viewpoint of refining cost, the pour point thereof may be −40° C. or higher. The pour point in the present specification means a pour point measured according to JIS K 2269:1987.

The sulfur content of the mineral oil may be 1000 ppm by mass or less, 500 ppm by mass or less, or 300 ppm by mass or less based on the total amount of the mineral oil. The lower limit value of the sulfur content of the mineral oil is not particularly limited, and is, for example, 10 ppm by mass or more. The sulfur content in the present specification means a sulfur content measured by an ultraviolet fluorescence method defined in JIS K 2541-6:2013.

The lubricating oil composition according to the present embodiment may further contain a synthetic oil such as a hydrocarbon oil or an oxygen-containing oil other than alkyl benzene as the base oil, in addition to the aforementioned mineral oil and alkyl benzene. In this case, the content of the mineral oil and/or alkyl benzene may be 50 mass % or more, more than 50 mass %, 70 mass % or more, or 90 mass % or more with respect to the total amount of the lubricating oil composition.

As the hydrocarbon oil other than alkyl benzene, for example, alkyl naphthalene and the like may be used. Furthermore, examples of the oxygen-containing oil include esters, and the ester may be, for example, an ester of a monohydric alcohol or a dihydroxy alcohol and a fatty acid. The monohydric alcohol or the dihydroxy alcohol may be, for example, an aliphatic alcohol having 4 to 12 carbon atoms. The fatty acid may be, for example, a fatty acid having 4 to 19 carbon atoms.

The lubricating oil composition according to the present embodiment may further contain additives as necessary in addition to the aforementioned base oil. Examples of the additives include an acid scavenger, an antioxidant, an extreme pressure agent, an oiliness agent, a defoaming agent, a metal deactivator, an antiwear agent, a viscosity index improver, a pour point depressant, and a detergent-dispersant. The content of these additives may be, for example, 20 mass % or less, or 10 mass % or less based on the total amount of the lubricating oil composition.

The kinematic viscosity at 40° C. of the lubricating oil composition according to the present embodiment may be, for example, 1 mm$^2$/s or more, 2 mm$^2$/s or more, or 2.5 mm$^2$/s or more, and may be 100 mm$^2$/s or less, 80 mm$^2$/s or less, 60 mm$^2$/s or less, 50 mm$^2$/s or less, 40 mm$^2$/s or less, 30 mm$^2$/s or less, 20 mm$^2$/s or less, or 10 mm$^2$/s or less, from the viewpoint of sliding property. Furthermore, the viscosity of the lubricating oil composition based on the ISO viscosity grade may be, for example, VG2 or more or VG3 or more, and may be VG100 or less, VG10 or less, or VG8 or less.

The flash point of the lubricating oil composition may be, for example, 100° C. or higher, 110° C. or higher, or 120° C. or higher, from the viewpoint of safety.

The acid value of the lubricating oil composition may be, for example, 1 mgKOH/g or less, 0.5 mgKOH/g or less, or 0.1 mgKOH/g or less.

The pour point of the lubricating oil composition may be, for example, −10° C. or lower, or −20° C. or lower, and may be −50° C. or lower, and from the viewpoint of refining cost, the pour point thereof may be −40° C. or higher.

The lubrication method according to the present embodiment can be applied to lubrication systems of various devices. Examples of such a lubrication system include lubrication systems for lubricating a part requiring lubricating property in mechanical devices including transport machines such as automobiles, rails, and aircrafts, industrial machines such as machine tools, electrical home appliances such as laundry machines, refrigerators, room-air conditioners, and vacuum cleaners, precision machines such as timepieces and cameras, and the like. Examples of the part requiring lubricating property include parts at which components such as a gear, a bearing, a pump, and a piston ring are in contact with each other so as to slide each other. Examples of mechanical devices including this part include an engine, a gear box, a compressor, and a hydraulic unit.

In the lubrication system, a method of supplying the lubricating oil composition to the sliding member is not particularly limited. For example, the lubrication system may include a storage unit storing the lubricating oil composition, a supplying unit supplying the lubricating oil composition from the storage unit to the sliding unit (sliding member), and the like. Furthermore, the supplying unit may be a circulation type supplying unit supplying the lubricating oil composition to the sliding unit (sliding member) by a supplying means such as a pump. Furthermore, the lubricating oil composition may be impregnated in the sliding member. Further, the lubrication system may be a lubrication system in which the lubricating oil composition is filled in a container provided with a sliding unit, like a compressor in a refrigerant circulation system such as a refrigerator or a room-air conditioner.

EXAMPLES

Hereinafter, the present invention will be described in more detail based on Examples; however, the present invention is not limited to the following Examples.

Sample oils 1 to 3 were prepared by using a mineral oil or alkyl benzene having properties shown in Table 1.

TABLE 1

|  |  | Sample oil 1 (VG8 mineral oil) | Sample oil 2 (VG3 mineral oil) | Sample oil 3 (VG4 alkyl benzene) |
| --- | --- | --- | --- | --- |
| Density (15° C.) | g/cm$^3$ | 0.87 | 0.83 | 0.86 |
| Flash point | ° C. | 156 | 130 | 148 |
| Kinematic viscosity (40° C.) | mm$^2$/s | 8.28 | 3.37 | 4.25 |
| Kinematic viscosity (100° C.) | mm$^2$/s | 2.26 | 1.30 | 1.43 |
| Acid value | mgKOH/g | ≤0.01 | ≤0.01 | ≤0.01 |
| Pour point | ° C. | −30.0 | −35.0 | <−45.0 |

Members 1 to 9 were prepared according to the following method.

<Member 1: Sliding Member Containing Liquid Crystal Polyester A>

60 mol % of p-hydroxybenzoic acid (HBA), 20 mol % of 4,4'-dihydroxybiphenyl (BP), 15 mol % of terephthalic acid (TPA), and 5 mol % of isophthalic acid (IPA) were added in a polymerization container having stirring blades, and potassium acetate and magnesium acetate were charged as a catalyst. Pressure reduction-nitrogen injection in the polymerization container was performed three times to perform nitrogen replacement, then acetic anhydride (1.08 molar equivalent with respect to a hydroxyl group) was further added, the temperature was increased to 150° C., and an acetylation reaction was performed in a reflux state for 2 hours.

After the completion of the acetylation reaction, the temperature of the polymerization container in an acetic acid distillation state was increased at 0.5° C./min, and when the temperature of the melt body in the tank reached 305° C., a polymer was removed, cooled, and solidified. The obtained polymer was ground to a size passing through a sieve having an opening of 2.0 mm by a grinding machine to obtain a prepolymer.

Next, the prepolymer obtained above was filled in a solid phase polymerization device, the temperature was increased to 320° C. by a heater, and then the temperature was maintained at 320° C. for 1 hour to perform solid phase polymerization. Thereafter, heat was naturally released at room temperature to obtain a powdery liquid crystal polyester A. The above-described powdery liquid crystal polyester A was processed into a pellet by using a twin screw extruder at a condition of 350° C., and the pellet was subjected to injection molding at a molding temperature of 350° C. and a mold temperature of 100° C. to obtain a test piece (30 mm×30 mm×thickness 1 mm).

<Member 2: Sliding Member Containing Liquid Crystal Polyester B, Solid Lubricant (Fluororesin and Carbon Black), Reinforcement Fiber (Carbon Fiber), and Antioxidant (Content of Fluororesin: 5 Mass %, Content of Carbon Black: 10 Mass %, Content of Carbon Fiber: 15 Mass %, Content of Antioxidant: 0.1 Mass %)>

A liquid crystal polyester B was obtained by the same operation as in the liquid crystal polyester A, except that 60 mol % of HBA, 15 mol % of BP, 7 mol % of TPA, 3 mol % of IPA, 5 mol % of acetaminophen (AAP), and 10 mol % of 1,4-cyclohexane dicarboxylic acid (CHDA) were added to a polymerization container having stirring blades.

A fluororesin (average particle diameter: 33 μm), carbon black (primary particle diameter: 24 nm), a carbon fiber (fiber length: 6 mm), and an antioxidant were mixed in advance so that they became a predetermined content with respect to the liquid crystal polyester B, thereby obtaining a mixture. This mixture was dried in an air oven at 150° C. for 2 hours. This dried mixture was supplied to a hopper of the twin screw extruder set at the highest temperature of a cylinder of 370° C. and melted and kneaded at 15 kg/hr, thereby obtaining a pellet of a liquid crystal polyester composition. The above-described pellet was subjected to injection molding at a molding temperature of 350° C. and a mold temperature of 100° C. to obtain a test piece (30 mm×30 mm×thickness 1 mm).

<Member 3: Sliding Member Containing Liquid Crystal Polyester B, Reinforcement Fiber (Carbon Fiber), and Antioxidant (Content of Carbon Fiber: 30 Mass %, Content of Antioxidant of: 0.1 Mass %)>

A carbon fiber (fiber length: 6 mm) and an antioxidant were mixed in advance so that they became a predetermined content with respect to the liquid crystal polyester B, thereby obtaining a mixture. This mixture was dried in an air oven at 150° C. for 2 hours. This dried mixture was supplied to a hopper of the twin screw extruder set at the highest temperature of a cylinder of 370° C. and melted and kneaded at 15 kg/hr, thereby obtaining a pellet of a liquid crystal polyester composition. The above-described pellet was subjected to injection molding at a molding temperature of 350° C. and a mold temperature of 100° C. to obtain a test piece (30 mm×30 mm×thickness 1 mm).

<Member 4: Sliding Member Containing PEEK>

"450G" (trade name) manufactured by Victrex plc. was used.

<Member 5: PEEK, Sliding Member Containing Solid Lubricant (Boron Nitride and Graphite) and Reinforcement Fiber (Carbon Fiber) (Content of Boron Nitride: 5 Mass %, Content of Graphite: 10 Mass %, Content of Carbon Fiber: 15 Mass %)>

A carbon fiber (fiber length: 6 mm), graphite, and boron nitride were mixed in advance so that they became a predetermined content with respect to PEEK (manufactured by Solvay S.A., trade name "KT-850P"), thereby obtaining a mixture. This mixture was dried in an air oven at 150° C. for 2 hours. This dried mixture was supplied to a hopper of the twin screw extruder set at the highest temperature of a cylinder of 390° C. and melted and kneaded at 15 kg/hr, thereby obtaining a pellet of a PEEK composition.

<Member 6: PEEK, Sliding Member Containing Solid Lubricant (Boron Nitride and Graphite) and Reinforcement Fiber (Carbon Fiber) (Content of Boron Nitride: 5 Mass %, Content of Graphite: 5 Mass %, Content of Carbon Fiber: 25 Mass %)>

A carbon fiber (fiber length: 6 mm), graphite, and boron nitride were mixed in advance so that they became a predetermined content with respect to PEEK (manufactured by Solvay S.A., trade name "KT-850P"), thereby obtaining a mixture. This mixture was dried in an air oven at 150° C. for 2 hours. This dried mixture was supplied to a hopper of the twin screw extruder set at the highest temperature of a cylinder of 390° C. and melted and kneaded at 15 kg/hr, thereby obtaining a pellet of a PEEK composition.

<Member 7: PEEK, Sliding Member Containing Solid Lubricant (Molybdenum Disulfide and Graphite) and Reinforcement Fiber (Carbon Fiber) (Content of Molybdenum Disulfide: 5 Mass %, Content of Graphite: 10 Mass %, Content of Carbon Fiber: 15 Mass %)>

A carbon fiber (fiber length: 6 mm), graphite, and molybdenum disulfide were mixed in advance so that they became a predetermined content with respect to PEEK (manufactured by Solvay S.A., trade name "KT-850P"), thereby obtaining a mixture. This mixture was dried in an air oven at 150° C. for 2 hours. This dried mixture was supplied to a hopper of the twin screw extruder set at the highest temperature of a cylinder of 390° C. and melted and kneaded at 15 kg/hr, thereby obtaining a pellet of a PEEK composition.

<Member 8: Polyamide (PA)>

"Polyamide 6" (trade name) manufactured by TOYO PLASTICS CO., LTD. was used.

<Member 9: Polyphenylene Sulfide (PPS)>

"QA200N" (trade name) manufactured by Solvay S.A. was used.

[Sliding Property Test]

Test Examples 1 to 21

The above-described sample oils 1 to 3 and members 1 to 9 were used by being combined as shown in Table 2 to Table 5, and the sliding property was evaluated by using a ball-on-disk reciprocating sliding tester according to the following method.

A steel ball (SUJ-2) having a diameter of ¼ inches was used as the ball, each member described in Table 2 to Table 5 was used as the disk, 1 g of each sample oil described in Table 2 to Table 5 was applied to the surface (sliding surface) of the disk, and then the ball and the disk were caused to slide each other to measure a friction coefficient. As for the sliding conditions, a sliding width of 20 mm (i 15 mm) and a slipping velocity of 5 mm/s were set, as for the test load, each load was changed per 5 minutes in order of 5 N, 10 N, and 20 N, and then the friction coefficient was measured at room temperature. The results are shown in Table 2 to Table 5.

TABLE 2

|  | Test Example 1 | Test Example 2 | Test Example 3 | Test Example 4 | Test Example 5 | Test Example 6 |
|---|---|---|---|---|---|---|
| Sample oil | 1 | 2 | 1 | 2 | 1 | 2 |
| Member | 1 | 1 | 2 | 2 | 3 | 3 |
| Friction coefficient | 0.07 | 0.049 | 0.035 | 0.048 | 0.043 | 0.051 |

TABLE 3

|  | Test Example 7 | Test Example 8 | Test Example 9 | Test Example 10 | Test Example 11 | Test Example 12 |
|---|---|---|---|---|---|---|
| Sample oil | 1 | 2 | 1 | 2 | 1 | 2 |
| Member | 4 | 4 | 5 | 5 | 6 | 6 |
| Friction coefficient | 0.047 | 0.053 | 0.042 | 0.063 | 0.040 | 0.055 |

TABLE 4

|  | Test Example 13 | Test Example 14 | Test Example 15 |
|---|---|---|---|
| Sample oil | 3 | 1 | 2 |
| Member | 6 | 7 | 7 |
| Friction coefficient | 0.055 | 0.035 | 0.044 |

TABLE 5

|  | Test Example 16 | Test Example 17 | Test Example 18 | Test Example 19 | Test Example 20 | Test Example 21 |
|---|---|---|---|---|---|---|
| Sample oil | 1 | 2 | 3 | 1 | 2 | 3 |
| Member | 8 | 8 | 8 | 9 | 9 | 9 |
| Friction coefficient | 0.1 | 0.069 | 0.32 | 0.08 | 0.08 | 0.12 |

REFERENCE SIGNS LIST

1: compressor, 2: condenser, 3: expansion mechanism, 4: evaporator, 5: flow passage, 6: refrigerant circulation system, 10: refrigerating machine.

The invention claimed is:

1. A lubrication method comprising:
lubricating a sliding member which comprises polyetheretherketone by using a lubricating oil composition which comprises at least one selected from the group consisting of
a mineral oil and
alkyl benzene
as a lubricating base oil;
wherein:
the sliding member further comprises a reinforcement fiber and a solid lubricant,
the solid lubricant comprises boron nitride and graphite, and
a content of the reinforcement fiber is equal to or more than a total content of the boron nitride and the graphite.

2. The lubrication method according to claim 1, wherein the lubricating oil composition comprises a mineral oil as a lubricating base oil.

3. The lubrication method according to claim 1, wherein a kinematic viscosity at 40° C. of the lubricating base oil is 1 to 100 mm$^2$/s.

4. The lubrication method according to claim 1, wherein a kinematic viscosity at 40° C. of the lubricating oil composition is 1 to 100 mm$^2$/s.

* * * * *